US012442224B2

(12) United States Patent
Weng

(10) Patent No.: US 12,442,224 B2
(45) Date of Patent: Oct. 14, 2025

(54) SLIDE RAIL STRUCTURE

(71) Applicant: TAI CHEER INDUSTRIAL CO., LTD, Yunlin County (TW)

(72) Inventor: Kuo-Chan Weng, Yunlin County (TW)

(73) Assignee: TAI CHEER INDUSTRIAL CO., LTD, Yunlin County (TW)

( * ) Notice: Subject to any disclaimer, the term of this patent is extended or adjusted under 35 U.S.C. 154(b) by 127 days.

(21) Appl. No.: 18/490,721

(22) Filed: Oct. 19, 2023

(65) Prior Publication Data

US 2025/0129639 A1 Apr. 24, 2025

(51) Int. Cl.
*E05B 65/463* (2017.01)

(52) U.S. Cl.
CPC .................................. *E05B 65/463* (2013.01)

(58) Field of Classification Search
CPC .... E05B 65/462; E05B 65/463; E05B 65/464; A47B 88/50; A47B 2210/0086; A47B 2097/008
See application file for complete search history.

(56) References Cited

U.S. PATENT DOCUMENTS 6,238,031 B1 * 5/2001 Weng .................. A47B 88/407 312/334.46
6,502,910 B2 * 1/2003 Kuo-Chan ............. A47B 88/57 312/334.46
7,320,507 B2 * 1/2008 White .................. E05B 65/464 312/217
7,467,833 B2 * 12/2008 Weng .................. E05B 65/463 312/333
11,089,872 B1 * 8/2021 Chen ..................... A47B 88/49
12,221,812 B2 * 2/2025 Xu ........................ A47B 88/50
2005/0263665 A1 * 12/2005 Weng .................. E05B 65/464 248/429
2008/0061663 A1 * 3/2008 Wu ...................... E05B 65/463 312/333
2009/0102339 A1 * 4/2009 Weng .................. E05B 65/463 312/333

FOREIGN PATENT DOCUMENTS

CN 115104867 A * 9/2022
CN 116058610 A * 5/2023 ............ A47B 88/40
CN 219645332 U * 9/2023
TW 1455700 B * 10/2014

* cited by examiner

*Primary Examiner* — Andrew Roersma

(57) ABSTRACT

A slide rail structure includes a slide rail body and a locking unit. The slide rail body includes a fixed rail, an extension rail, and a telescopic rail. The locking unit includes a locking seat, a latch, at least one locking plate, and a locking spring. The locking seat is installed on the non-end position of the fixed rail to allow the extension rail slides and displaces along the fixed rail. The locking seat has a guide groove for slidingly installing the latch. The locking plate is inserted between the two insertion holes of the slide rail body, and both ends of the locking plate are formed a guide inclined end. The present invention can limit the opening of only one drawer at the same time to prevent the center of gravity from shifting outwards and avoid the risk of the cabinet toppling.

5 Claims, 18 Drawing Sheets

SLIDE RAIL STRUCTURE

BACKGROUND OF THE INVENTION

Field of the Invention

This invention relates to a slide rail, in particular to a slide rail structure that is applied to a cabinet containing several drawers and can avoid pulling out several drawers at the same time.

Description of the Related Art

The conventional cabinets such as tool cabinets or file cabinets generally include a number of drawers arranged up and down. After placing items in each drawer, each drawer has formed a heavy entity. Although the design of the conventional slide rail set makes the drawers labor-saving when pushing/pulling drawers and can be fully opened, however, when multiple drawers are pulled out at the same time, the cabinet body may easily tip over due to the outward shift of the center of gravity.

Therefore, in order to prevent the risk of overturning due to opening too many drawers at the same time, a conventional slide rail locking structure has been developed to limit only one drawer to being opened at a time. There is a set of locking devices equipped at one end of each slide rail set. Once the drawer slide rail in one of the slide rail sets is pulled, the locking device will be activated and drive a connecting rod between each slide rail set to prevent other slide rail sets being pulled. However, as shown in FIGS. 16, 17, and 18, the conventional locking devices 50 is installed at the end of the fixed rail 61 of the slide rail set 60, and the locking device 50 also serves as a limit for the telescopic rail 62 of the slide rail set 60 to achieve locking and unlocking purposes through the contact between the end of the telescopic rail 62 and the locking device 50. The insertion holes 611 are formed at two ends on both sides of the fixed rail 61 for two connecting rods 51 to pass through to link the locking device 50. The connecting rods 51 are then used to achieve the interlock between several slide rail sets 60, thereby utilizing the interlock between each locking device 50 and each slide rail set 60 to achieve the effect of locking or releasing other drawers.

The above-mentioned conventional structure still has some problems. The conventional locking device 50 also has the purpose of blocking the telescopic rail 62, making the locking device 50 larger in size and can only being installed at the end of the fixed rail 61. When the slide rail set 60 is installed inside the cabinet, since the slide rail set 60 and the connecting rod 51 can only be plugged and installed one by one from bottom to top, the locking device 50 located at the end makes the workers have to enter the cabinet to install the connecting rod 51. It is extremely difficult and inconvenient to install in a small cabinet space, which greatly reduces the assembly efficiency.

In addition, there is another conventional design on the market that installs the locking device on the front end of the slide rail set. However, because the technology is not yet mature, the structure installed on the front end is weak and the locking function is easy to fail when pulled hard, making it difficult to use. This design is more inconvenient and dangerous.

SUMMARY OF THE INVENTION

The technical problem to be solved by this invention is to provide a slide rail structure that is easy to install. The slide rail structure includes: a slide rail body and a locking unit. The slide rail body includes a fixed rail, an extension rail sliding along the fixed rail, and a telescopic rail sliding along the extension rail. The end of the fixed rail is provided with a blocking part, and a combination part is provided in the non-end position. Both sides of the fixed rail are provided with two insertion holes corresponding to the combination part. A groove is recessively formed on the bottom surface of the extension rail along the forming direction. The groove is provided with an inward-pushing protrusion relative to the combination part of the fixed rail, and a through hole is provided adjacent to the inward-pushing protrusion. The locking unit includes a locking seat, a latch, at least one locking plate, and a locking spring. The locking seat is installed on the combination part of the fixed rail, and the thickness of the locking seat is smaller than the depth of the groove, so as to allow the extension rail slides and displaces along the fixed rail. The locking seat has a guide groove for slidingly installing the latch. The locking seat forms a stop toward the front end of the fixed rail and forms an opening at the other end of the fixed rail. The opening has a guide slope, and the upper surface of the locking seat is provided with a hollow portion from the opening to the middle position, and two lock sockets are provided on both sides of the locking seat corresponding to the two insertion holes connecting with the guide groove. An outer push portion and an inner push portion are protruding from the surface of the latch. Both the inner push portion and the outer push portion are introduced into the hollow portion and are lower than the upper surface of the locking seat. The locking plate is inserted between the two insertion holes of the slide rail body, and both ends of the locking plate are formed a guide inclined end. The guide inclined end is inserted into the lock socket of the locking seat and connected with the latch to form the locked/unlocked states of the slide rail body. The locking spring is installed in the groove of the extension rail. The locking spring has a raised slope facing the through hole, and the end of the raised slope is bent downward to form a leading end. The center of the leading end is concave to form an extrapolated top.

Comparing to the prior arts, the present invention uses the locking unit to limit the opening of only one drawer at the same time, so as to prevent the center of gravity from shifting outwards, thereby avoiding the risk of the cabinet toppling and improving the safety of cabinet use.

In addition, the locking seat of the locking unit has a simplified structure and a greatly reduced volume, allowing the groove of the extension slide rail to slide through, so that the locking seat can be installed at a non-end position of the fixed rail. Especially, the locking seat can be directly installed near the front end of the fixed rail, so that the assembler can assemble the fixed rail and set the locking plate in a relatively easy and labor-saving manner in a small cabinet space, thereby greatly improving the convenience of slide rail body installation and improving assembly efficiency.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF THE INVENTION

Figure 1:
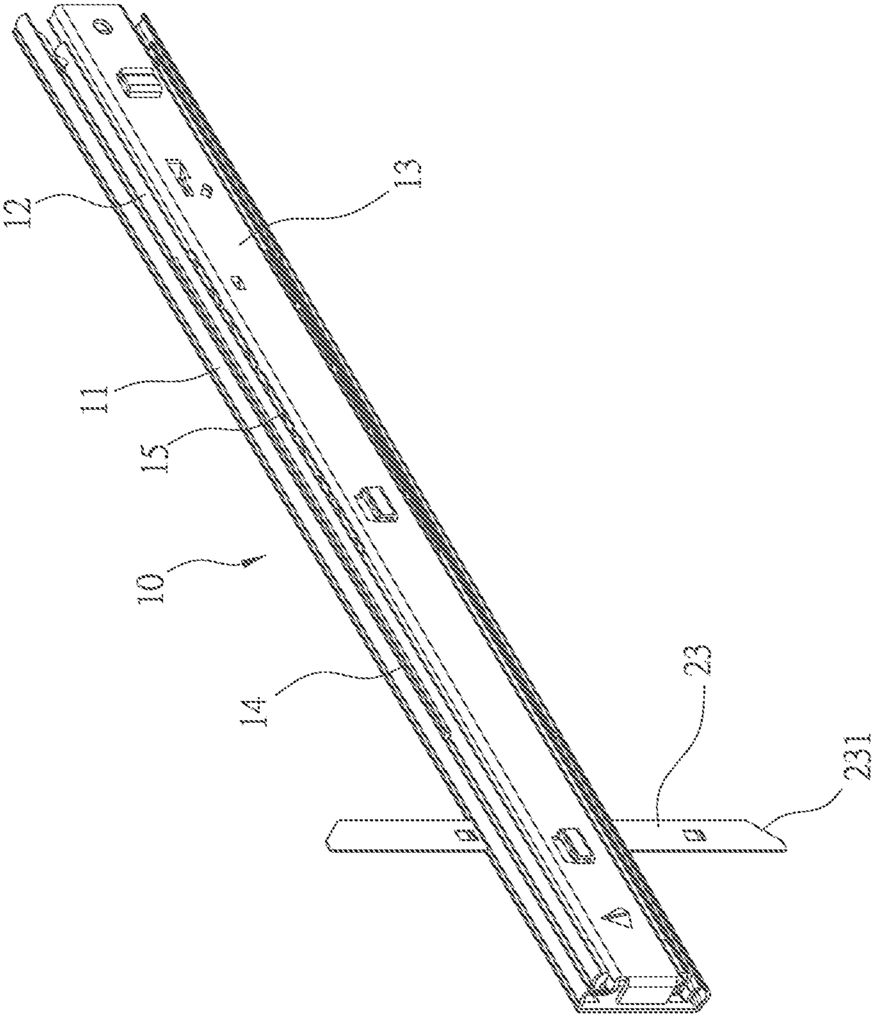
FIG. 1 illustrates a three-dimensional view of this invention.

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

As shown in FIGS. 1, 2, 3, and 4, a slide rail structure includes: a slide rail body 10 and a locking unit 20. The slide rail body 10 includes a fixed rail 11, an extension rail 12 sliding along the fixed rail 11, and a telescopic rail 13 sliding along the extension rail 12. The end of the fixed rail 11 is provided with a blocking part 111, and a combination part 112 is provided in the non-end position. Both sides of the fixed rail 11 are provided with two insertion holes 113 corresponding to the combination part 112, and the fixed rail 11 is provided with a blocking protrusion 114 adjacent to the combination part 112. A groove 121 is recessively formed on the bottom surface of the extension rail 12 along the forming direction. The groove 121 is provided with an inward-pushing protrusion 122 relative to the combination part 112 of the fixed rail 11, and a through hole 123 is provided adjacent to the inward-pushing protrusion 122. Two ball slides 14 are equipped between the inner walls of both sides of the fixed rail 11 and the outer walls of both sides of the extension rail 12. The fixed rail 11 is provided with two blocking protrusions 115 on both sides of the front end, and two abutting protrusions 124 are provided on both sides of the end of the extension rail 12. The blocking protrusions 115 and the abutting protrusions 124 abut against the two ends of the ball slide 14 to further limit the length of the extension rail 12 sliding and pulling out along the fixed rail 11.

The locking unit 20 includes a locking seat 21, a latch 22, at least one locking plate 23, and a locking spring 24. The locking seat 21 is installed on the combination part 112 of the fixed rail 11, and the thickness of the locking seat 21 is smaller than the depth of the groove 121, so as to allow the extension rail 12 slides and displaces along the fixed rail 11. The locking seat 21 has a guide groove 211 for slidingly installing the latch 22. The locking seat 21 forms a stop 212 toward the front end of the fixed rail 11 and forms an opening 213 at the other end of the fixed rail 11. The opening 213 has a guide slope 214, and the upper surface of the locking seat 21 is provided with a hollow portion 215 from the opening 213 to the middle position, and two lock sockets 216 are provided on both sides of the locking seat 21 corresponding to the two insertion holes 113 connecting with the guide groove 211. The latch 22 is slidably assembled into the guide groove 211 of the locking seat 21, and the blocking protrusion 114 limits the displacement distance of the latch 22.

An outer push portion 221 and an inner push portion 222 are protruding from the surface of the latch 22. Both the inner push portion 222 and the outer push portion 221 are introduced into the hollow portion 215 and are lower than the upper surface of the locking seat 21. The locking plate 23 is inserted between the two insertion holes 113 of the slide rail body 10, and both ends of the locking plate 23 are formed a guide inclined end 231. The guide inclined end 231 is inserted into the lock socket 216 of the locking seat 21 and connected with the latch 22 to form the locked/unlocked states of the slide rail body 10. The locking spring 24 is installed in the groove 121 of the extension rail 12. The locking spring 24 has a raised slope 241 facing the through hole 123, and the end of the raised slope 241 is bent downward to form a leading end 242. The center of the leading end 242 is concave to form an extrapolated top 243.

A buckle unit 30 is further provided between the extension rail 12 and the telescopic rail 13 of the slide rail body 10. The buckle unit 30 includes a buckle plate 31 and a positioning plate 32. To further illustrate, the combination part 112 is provided near the front end of the fixed rail 11 and is used to install the locking seat 21. A first guide piece 116 is protruding from the fixed rail 11 near the rear end. The first guide piece 116 is narrow at the top and wide at the bottom and has two rising slopes 117 on both sides. A second guide piece 118 is protruding from the fixed rail 11 between the front and rear ends adjacent to the combination part 112. The second guide piece 118 is wide at the top and narrow at the bottom and has two sinking slopes 119 on both sides. A limiting protrusion 110 underneath the sinking slopes 119 is formed toward the rear end. The first and second guide pieces 116 and 118 both face the groove 121 of the extension rail 12. The bucking plate 31 is swingably provided on the first guide piece 116 of the extension rail 12 adjacent to the rear end and corresponding to the fixed rail 11. The bucking plate 31 has a detent rib 311 at one end and an arc groove 125 extending through the extension rail 12 is formed for the detent rib 311 to pass through, further limiting the swing range of the bucking plate 31 and causing the detent rib 311 to form a convex shape in the groove 121. A push portion 312 is further formed on the surface of the bucking plate 31. The positioning plate 32 is equipped at the telescopic rail 13 adjacent to the rear end and corresponding to the bucking plate 31 of the extension rail 12. The positioning plate 32 has an outward pushing step portion 321, and the telescopic rail 13 is further provided a supporting protrusion 131 below the outward pushing step portion 321.

Figure 5:
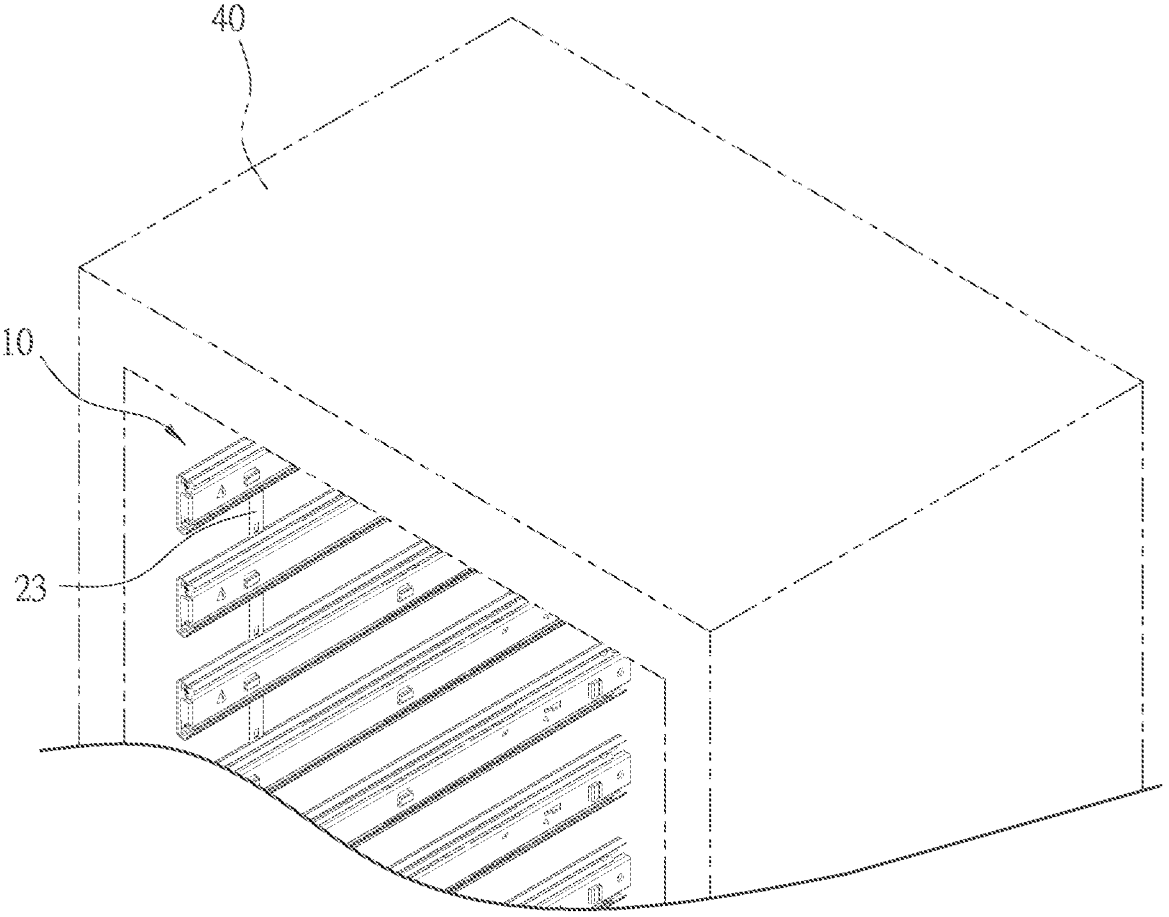
FIG. 5 illustrates a schematic diagram showing the invention installed in a cabinet.
Figure 6:
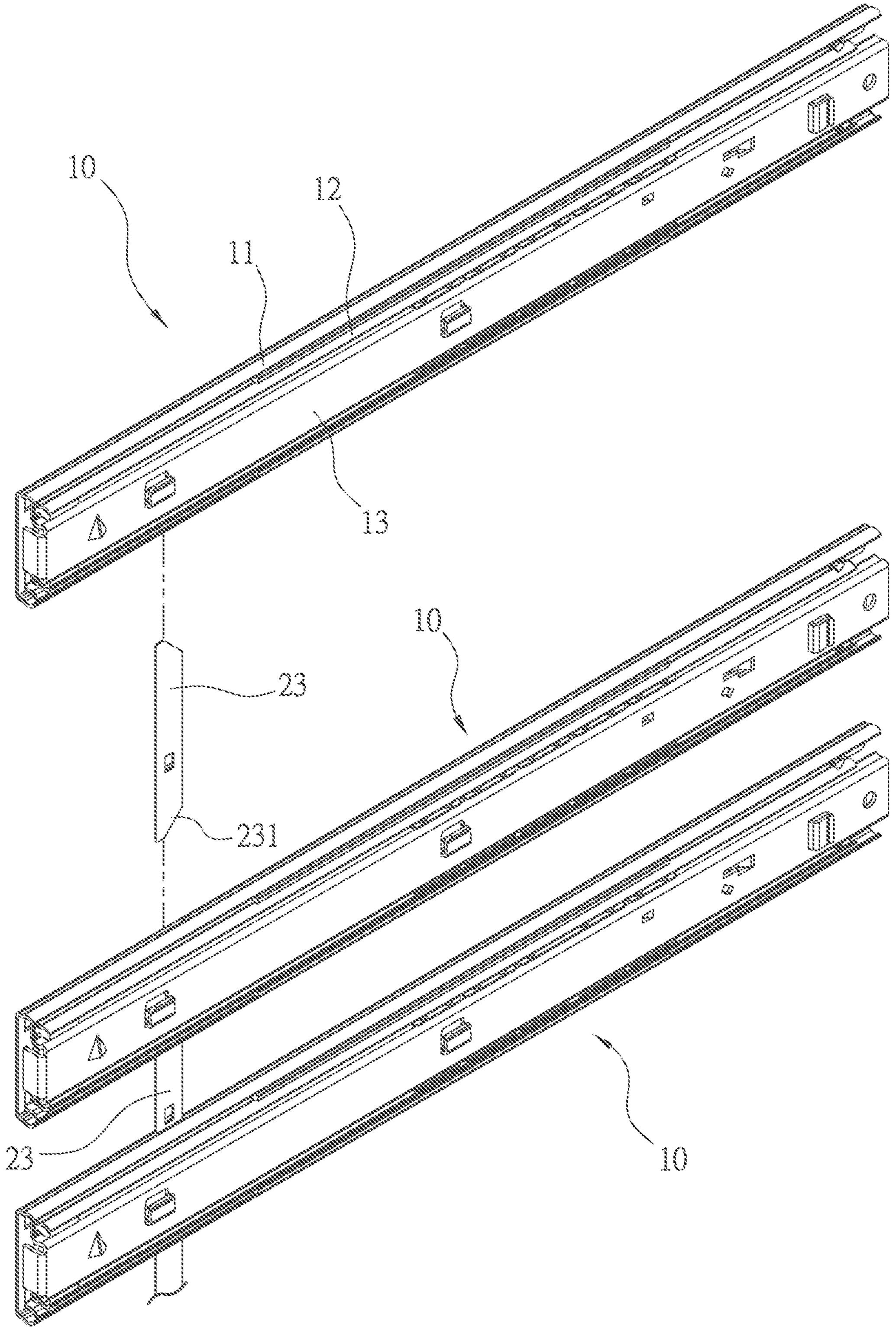
FIG. 6 illustrates a schematic diagram of several slide rail bodies connected in series through locking plates in this invention.
Figure 7:
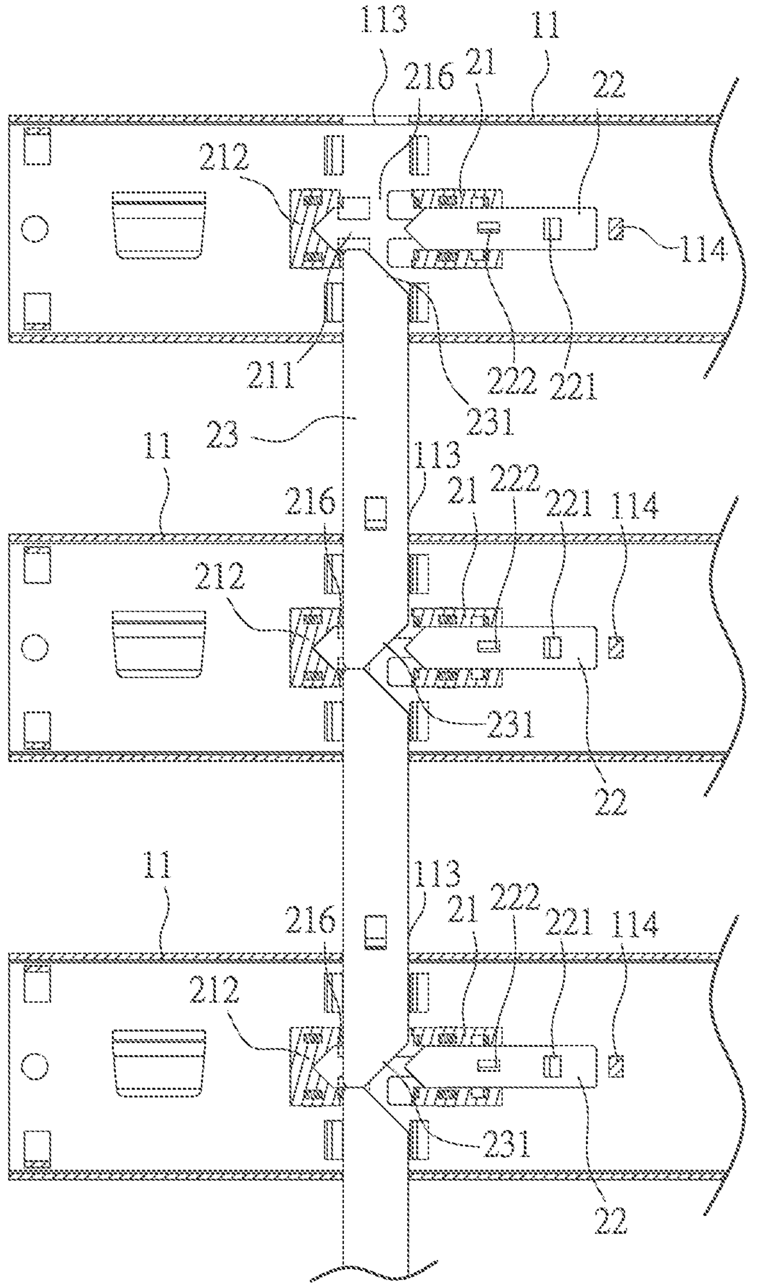
FIG. 7 illustrates a cross-sectional view of several fixed rails of this invention connected in series through locking plates and forming an unlocked state.

As shown in FIGS. 5, 6, and 7, the slide rail body 10 is applied to the cabinet 40 that includes a plurality of drawers arranged up and down. The fixed rails 11 of the slide rail body 10 are sequentially arranged on the two inner walls of the cabinet 40 from bottom to top, and one side of the cabinet 40 is respectively provided with the locking plate 23 between two fixed rails 11. The guide inclined end 231 at the lower end of the locking plate 23 passes through the insertion hole 113 of the lower fixed rail 11, and then extends into the guide groove 211 of the lock base 21 along the lock socket 216 and beyond the hollow portion 215.

The guide inclined end 231 at the lower end of the locking plate 23 is in contact with the end edge of the latch 22. The guide inclined end 231 at the upper end of the locking plate 23 passes through the insertion hole 113 of the upper fixed rail 11, and only passes the lock socket 216 with its end without inserting into the guide groove 211. The locking plates 23 are in contact with each other through the lock socket 216 of the lock seat 21, thereby installing the fixed rail 11 and the locking plate 23 on the inner wall of the cabinet 40 in sequence. The telescopic rail 13 is assembled on both sides of each drawer, and the telescopic rail 13 and the extension rail 12 are then slidably installed and the drawers are further assembled into the cabinet 40.

Figure 2:
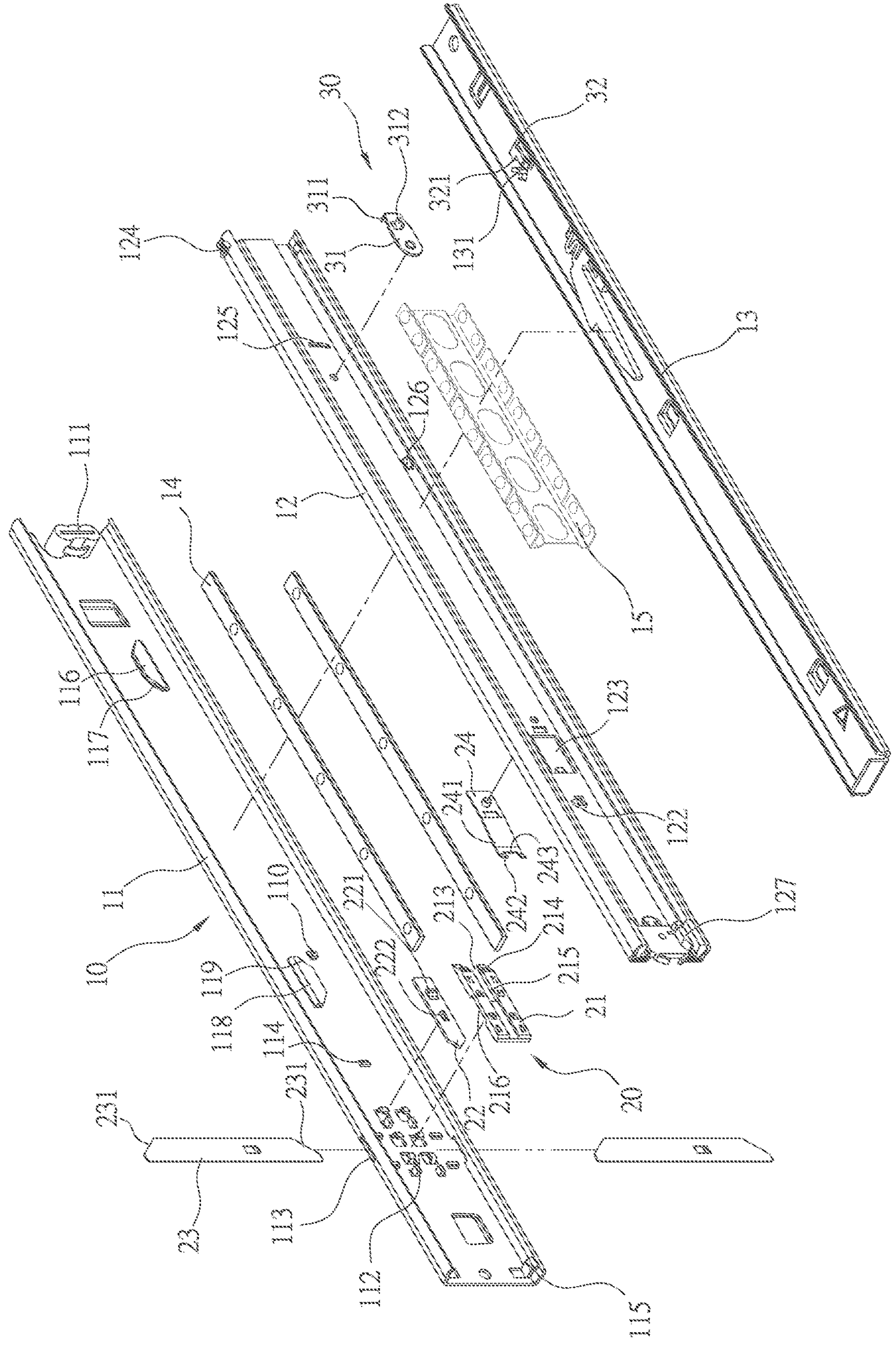
FIG. 2 illustrates an exploding view of this invention.
Figure 3:
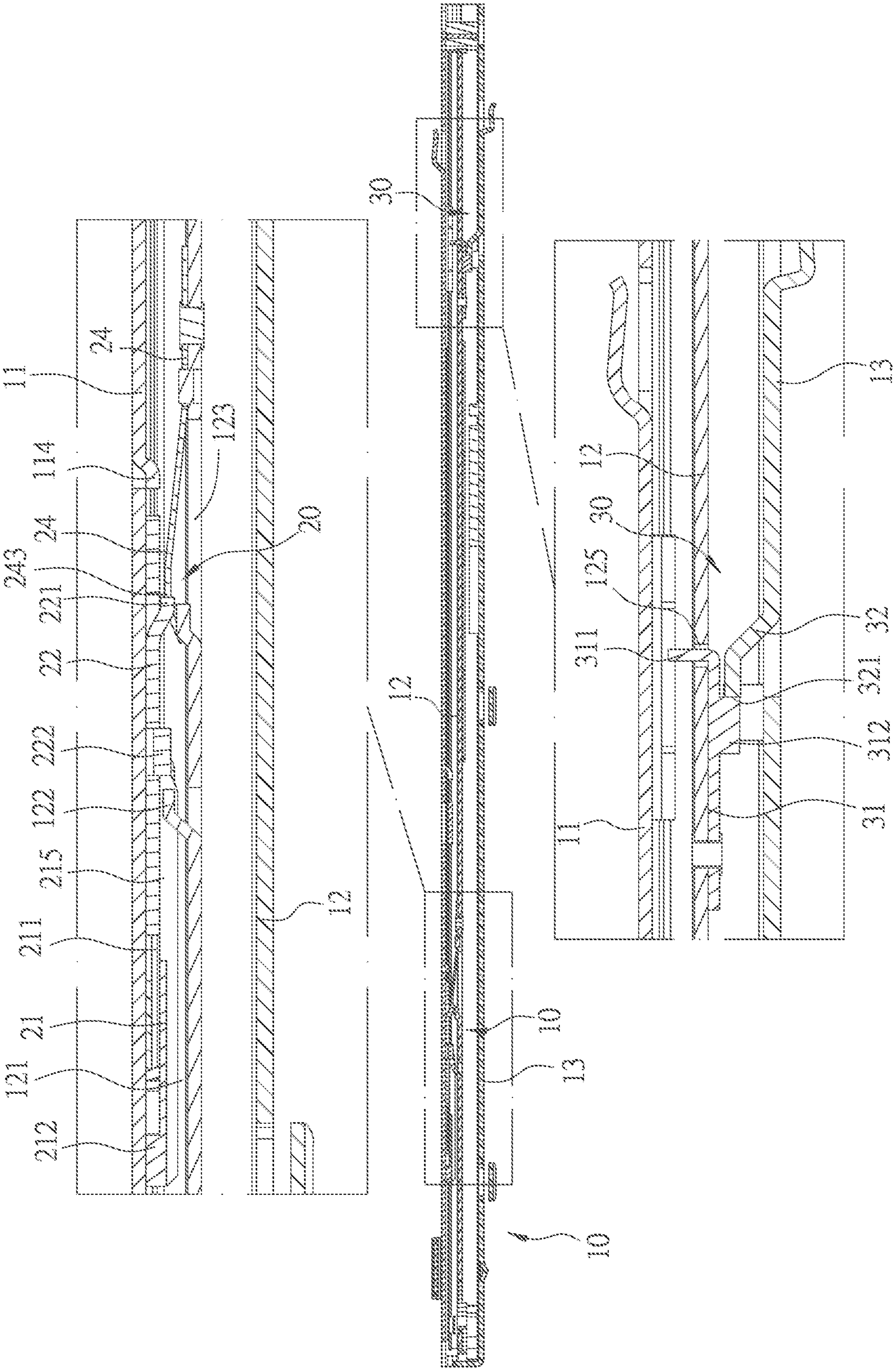
FIG. 3 illustrates a combined cross-sectional view and partial enlarged schematic diagram of this invention.
Figure 4:
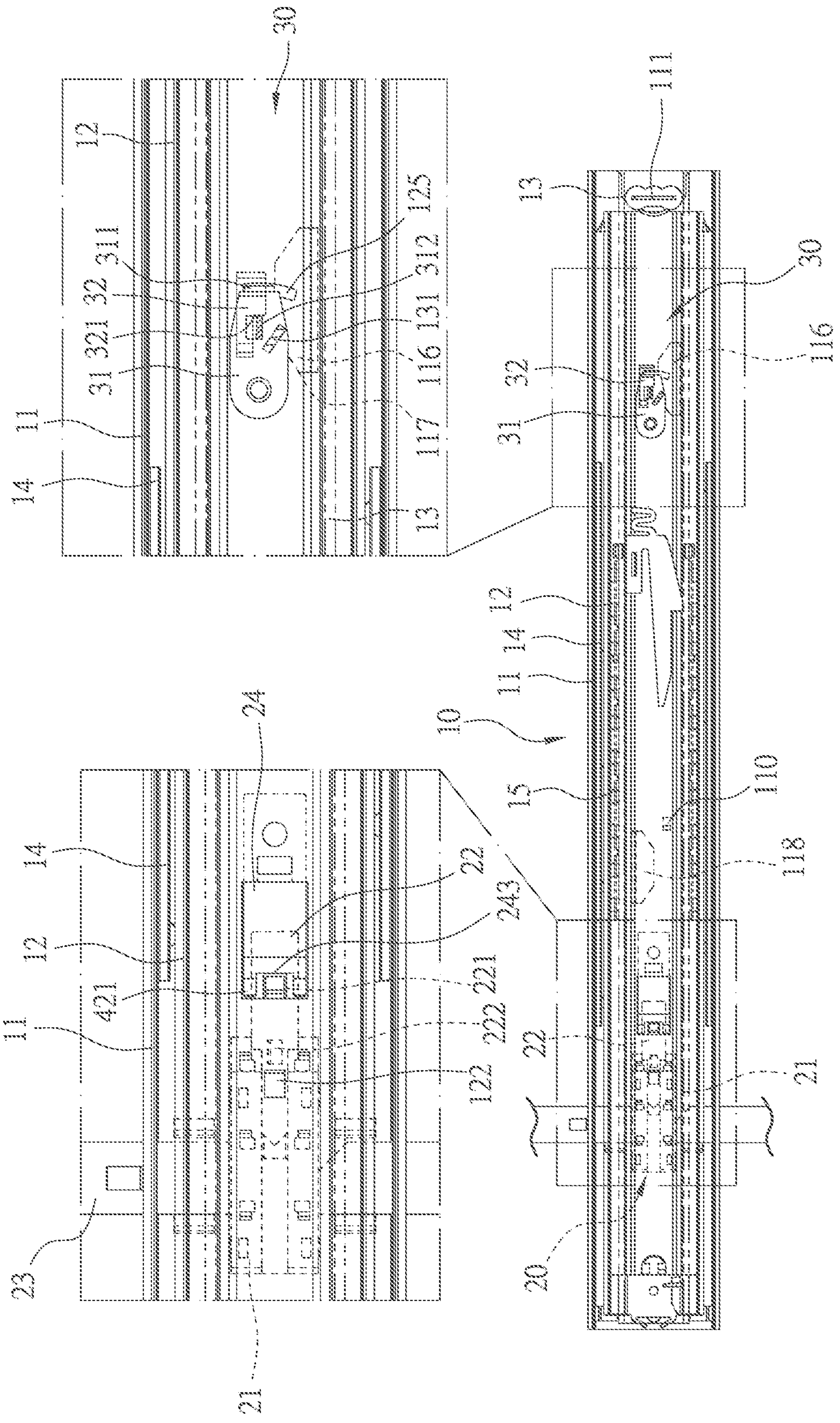
FIG. 4 illustrates an elevation and partial enlarged schematic diagram of this invention.

As shown in FIGS. 2, 3, and 4, the two sides of the extension rail 12 are equipped with two ball slides 14 slidably assembled into the fixed rail 11. The telescopic rail 13 is equipped with a ball slide seat 15 slidably assembled into the extension rail 12. The extension rail 12 is provided with two limiting protrusions 126 on both sides of the middle section, and is further provided with a stopper 127 at the front end, further utilizing the limiting protrusions 126 and the stopper 127 limits the displacement stroke of the ball slide seat 15. When the telescopic rail 13 and the extension rail 12 of the slide rail body 10 are completely retracted into the fixed rail 11, the push portion 221 of the latch 22 abuts the extrapolated top 243 of the locking spring 24, and keep the latch 22 away from the lock socket 216 of the locking seat 21. At this time, each locking plate 23 can freely move back and forth between the guide grooves 211 along the lock socket 216, so that the locking unit 20 is in an unlocked state. At the same time, the bucking plate 31 installed on the extension rail 12 is displaced and swings along the rising bevel 117 of the first guide piece 116 through the detent rib 311 to form a horizontal shape, and the positioning plate 32 installed on the telescopic rail 13 is in contact with the bucking plate 31. The push portion 312 of the bucking plate 31 is pressed against the positioning plate 32 to push the pushing step portion 321 outward, thereby completing the process of assembling the slide rail body 10 and the installation application of the cabinet.

Figure 8:
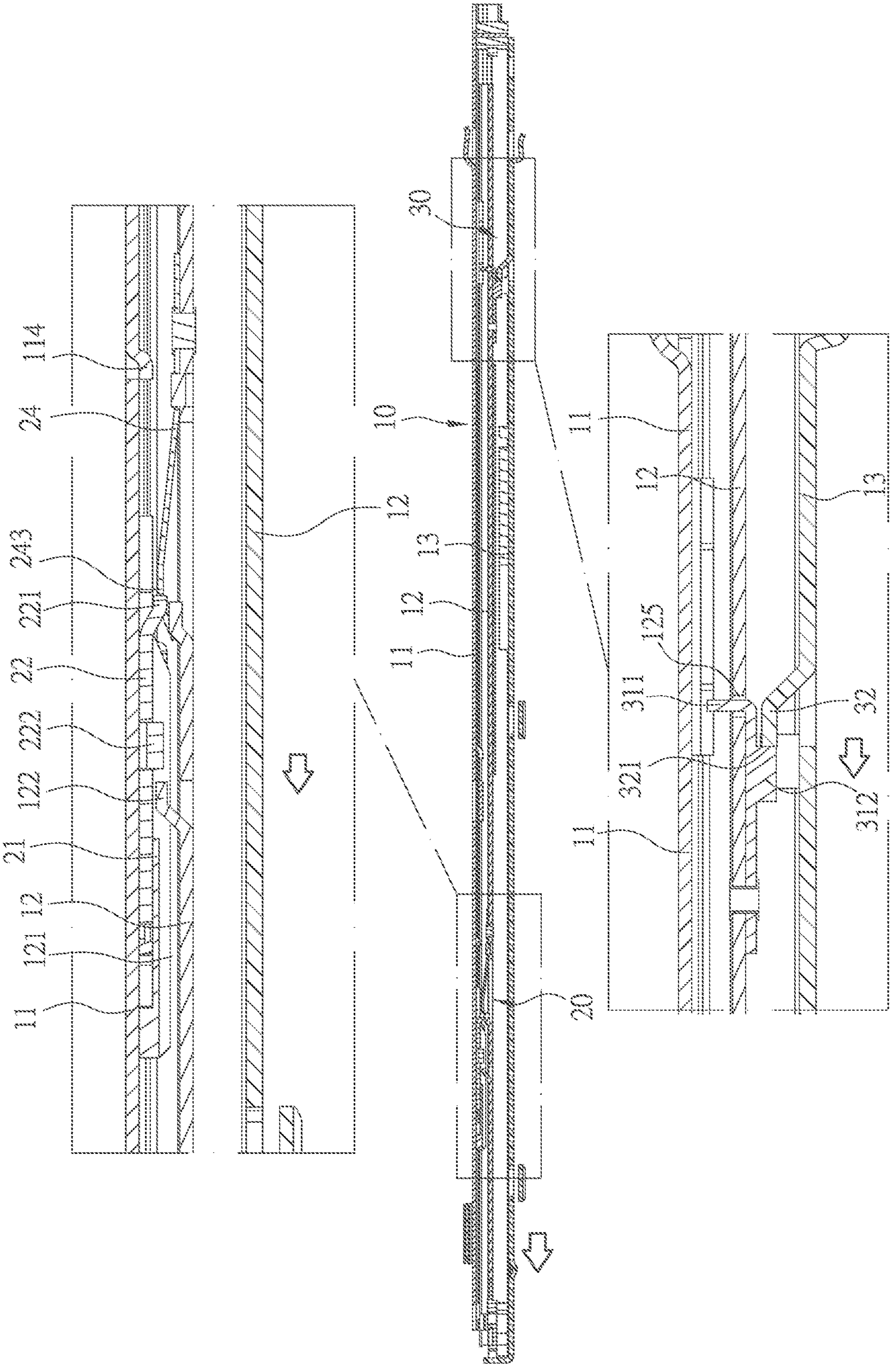
FIG. 8 illustrates a cross-sectional view and a partially enlarged schematic diagram of the telescopic rail pulled out of this invention.
Figure 9:
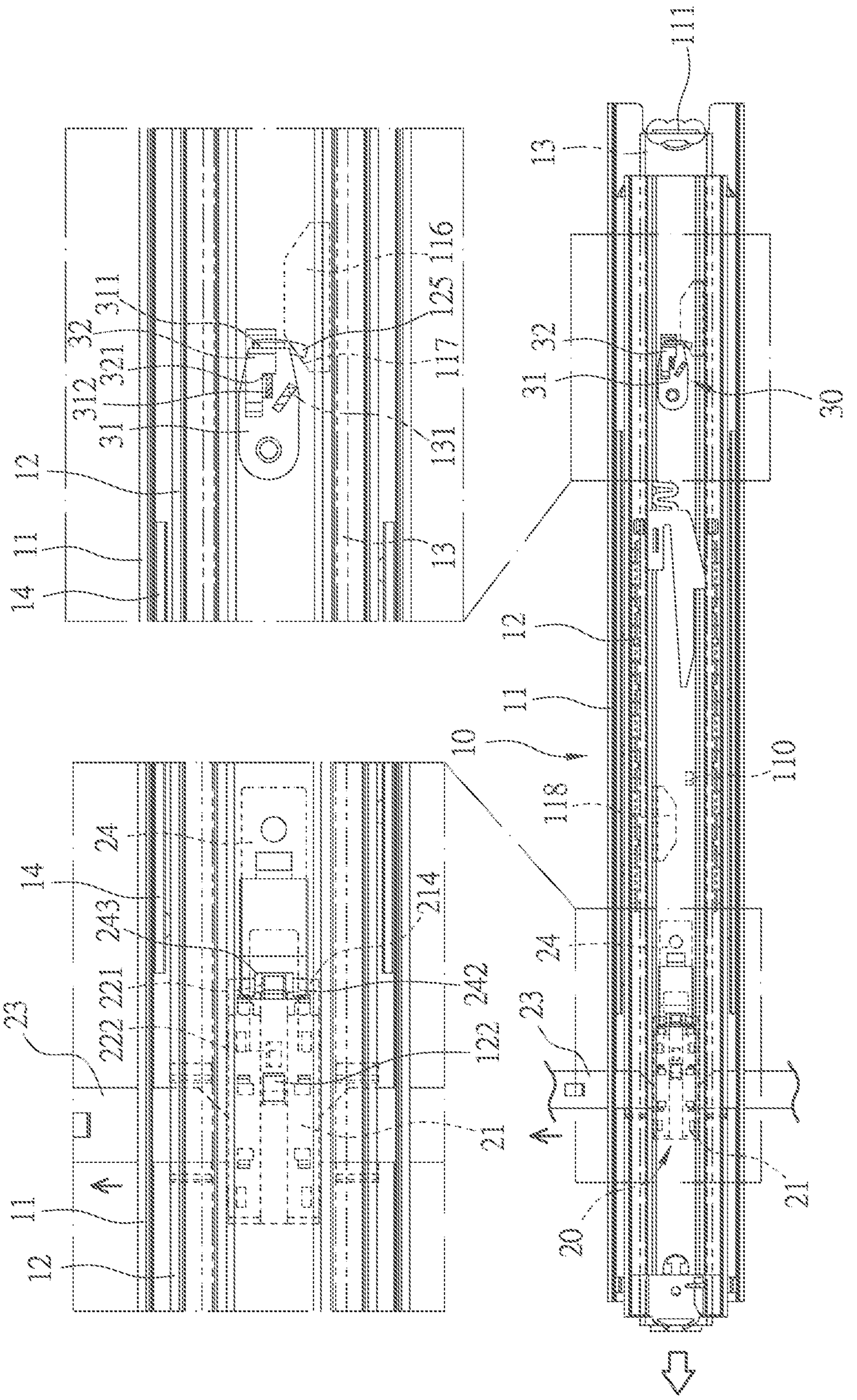
FIG. 9 illustrates an elevation view and partially enlarged schematic diagram of the telescopic rail pulled out of this invention.
Figure 10:
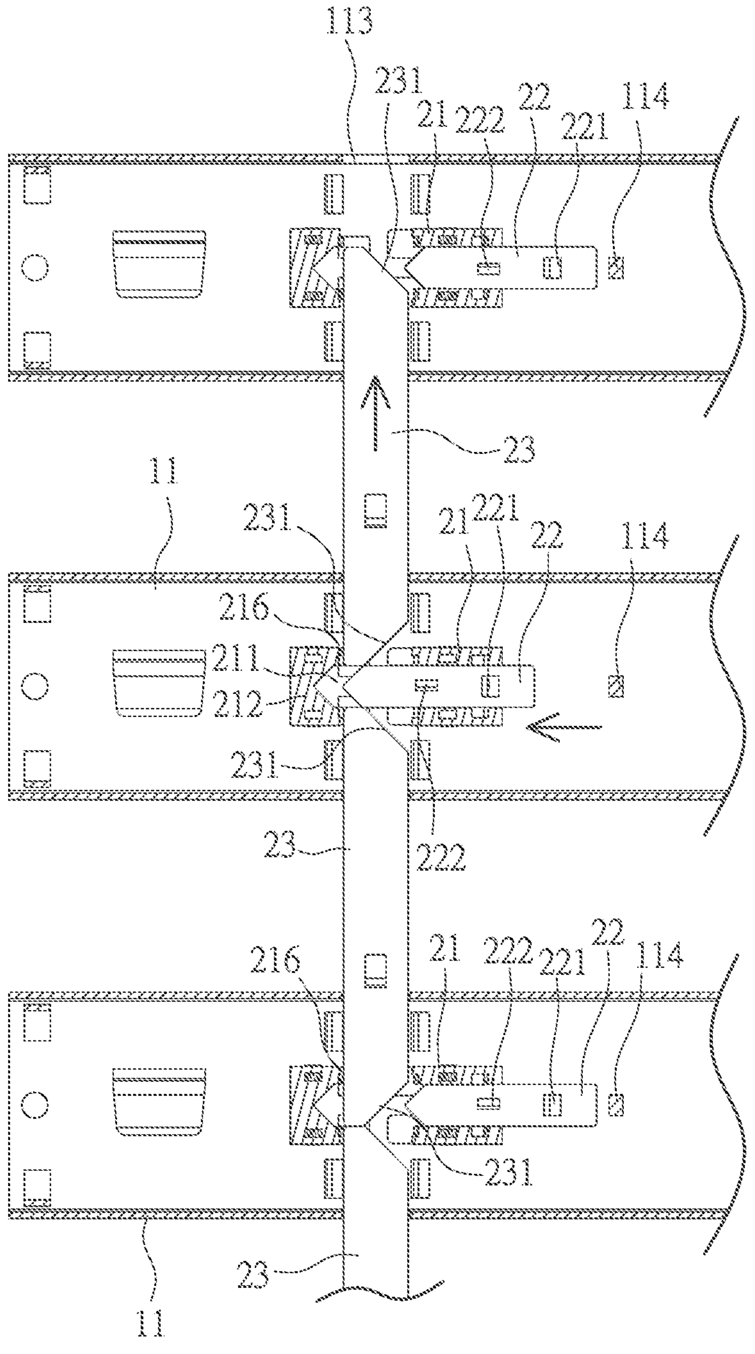
FIG. 10 illustrates a cross-sectional view after the telescopic rail of this invention is pulled out and interlocked with the locking unit to form a locked state.
Figure 11:
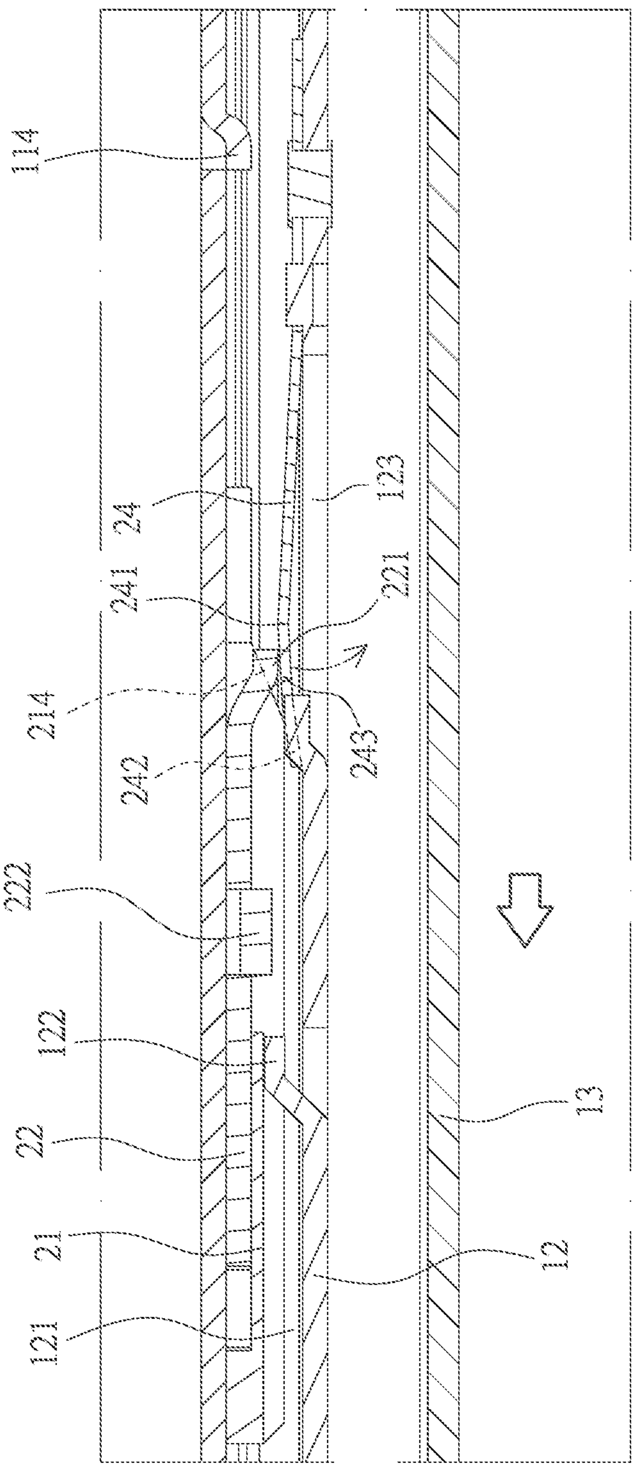
FIG. 11 illustrates a schematic diagram of the locking spring of this invention passing over the locking seat so that the extension rail is fixed along the rail pulling out.
Figure 12:
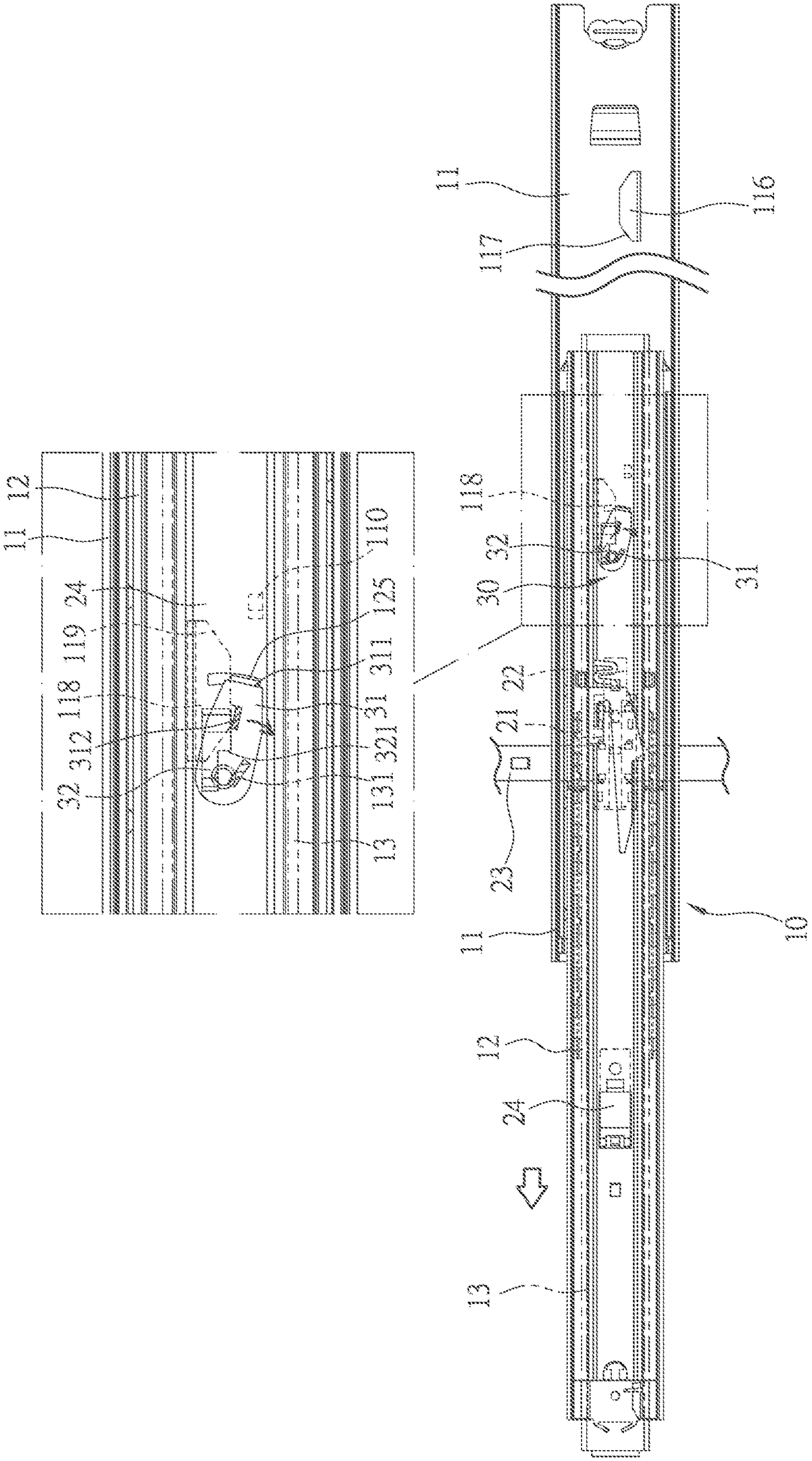
FIG. 12 illustrates a schematic diagram of the telescopic rail of this invention being continuously pulled out and disengaged from the locking plate.
Figure 13:
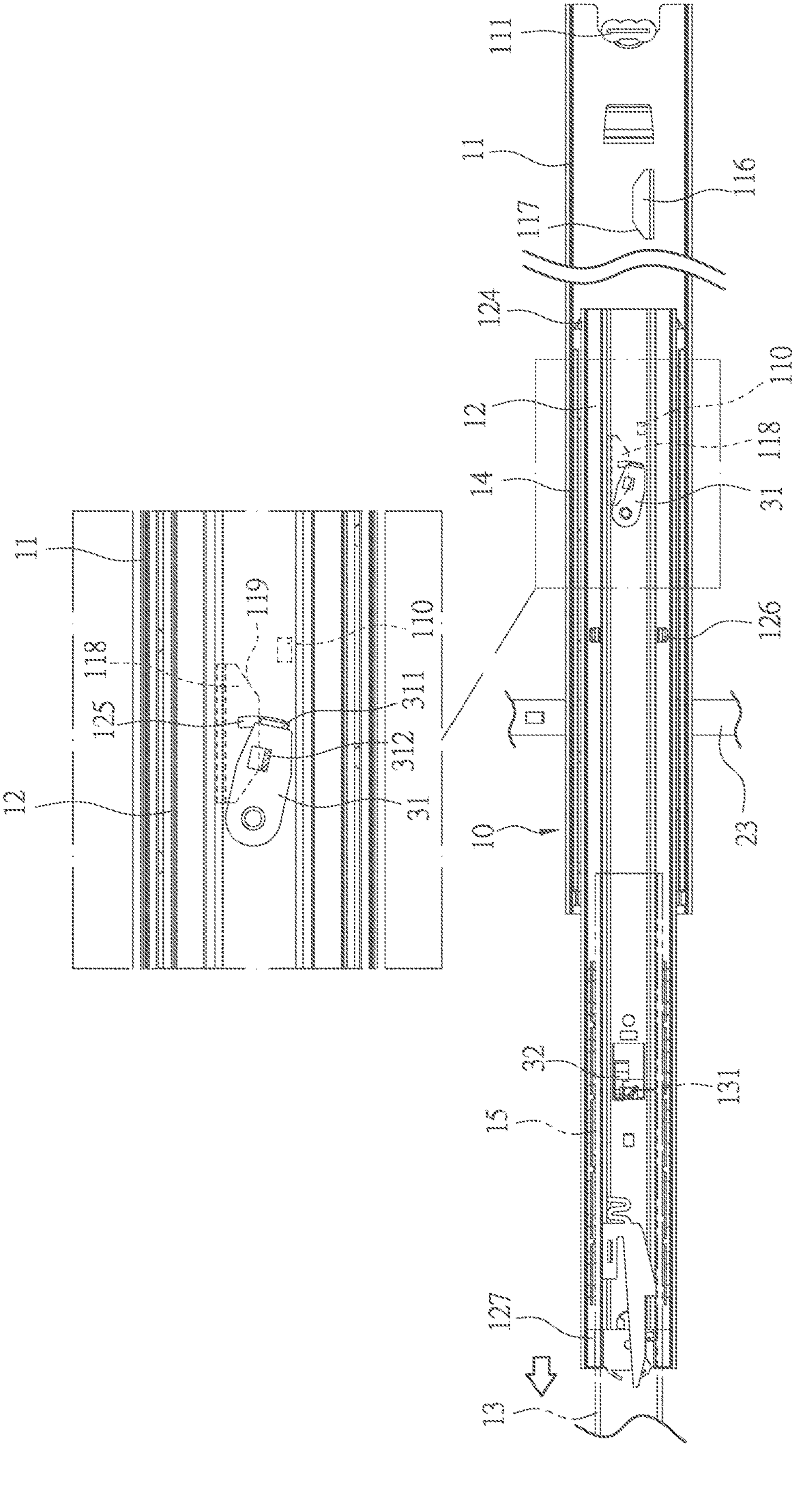
FIG. 13 illustrates a schematic diagram of the telescopic rail of this invention being pulled out along the extension rail.

The actual use state of the structure can be seen from FIGS. 8, 9, and 10. When one of the drawers of the cabinet 40 is pulled out and opened, the extrapolated top 243 of the locking spring 24 is pressed against the push portion 221 of the latch 22 to push and move. The positioning plate 32 provided on the telescopic rail 13 simultaneously pushes the push portion 312 of the bucking plate 31 with the pushing step portion 321, so that the telescopic rail 13 synchronously pushes the extension rail 12 to move. When the extension rail 12 moves synchronously with the telescopic rail 13, the locking spring 24 continues to push the latch 22 toward the guide groove 211 of the locking seat 21, and the latch 22 is used to push against the guide inclined end 231 at the lower end of the locking plate 23, so that the locking plate 23 moves up and away from the guide groove 211. At the same time, the latch 22 blocks the lock socket 216 on both sides of the lock seat 21, so that the locking plate 23 on both sides of the locking seat 21 are blocked and restricted. The upper guide inclined end 231 of the locking plate 23 extends the guide groove 211 of the locking seat 21 inside the upper slide rail body 10, so that the locking unit 20 in the upper slide rail body 10 cannot provide the latch 22 to penetrate into the guide groove 211 to form a locked state, and the locking unit 20 of the lower slide rail body 10 is in a restricted state because the locking plate 23 are abutted against each other, so that the locking unit 20 in the lower slide rail body 10 cannot provide the latch 22 to penetrate into the guide groove 211 to form a locked state. Accordingly, the locking spring 24 in other slide rail bodies 10 cannot push the latch 22 and restricts the extension rail 12 and telescopic rail 13 of other slide rail bodies 10 from being pulled out, so as to prevent several drawers from being opened at the same time. This will prevent the cabinet from tipping due to the center of gravity shifting outwards.

When one of the above-mentioned drawers continues to be pulled out, as shown in FIGS. 9, 11, 12, and 13, the telescopic rail 13 will first synchronously push the extension rail 12 to move, and the locking spring 24 of the extension rail 12 will push the latch 22, the leading end 242 of the locking spring 24 will first hit the guide slope 214 of the locking seat 21 to form compression, and will be squeezed in the direction of the through hole 123, so that the extrapolated top 243 of the locking spring 24 is pushed away from the push portion 221 of the latch 22. The locking spring 24 is further pushed over the upper surface of the locking seat 21, so that the extension rail 12 can continue to be pulled outward along the fixed rail 11. Then, when the extension rail 12 is restricted by the two ball slides 14 and the fixed rail 11 and can no longer slide, the bucking plate 31 of the extended rail 12 will first pass through the second guide piece 118 of the fixed rail 11. At this time, the horizontal bucking plate 31 is displaced downwards through the detent rib 311 along the sinking slope 119 of the second guide piece 118, so that the push portion 312 of the bucking plate 31 sinks away from the step portion 321 of the positioning plate 32, and the telescopic rail 13 can be pulled out again and the drawer can be fully pulled out and opened. The bucking plate 31 swings downward is then used to abut against the limiting protrusion 110 below the second guide piece 118 by using the latch protrusion 411 to prevent the extension rail 12 from moving back.

Figure 14:
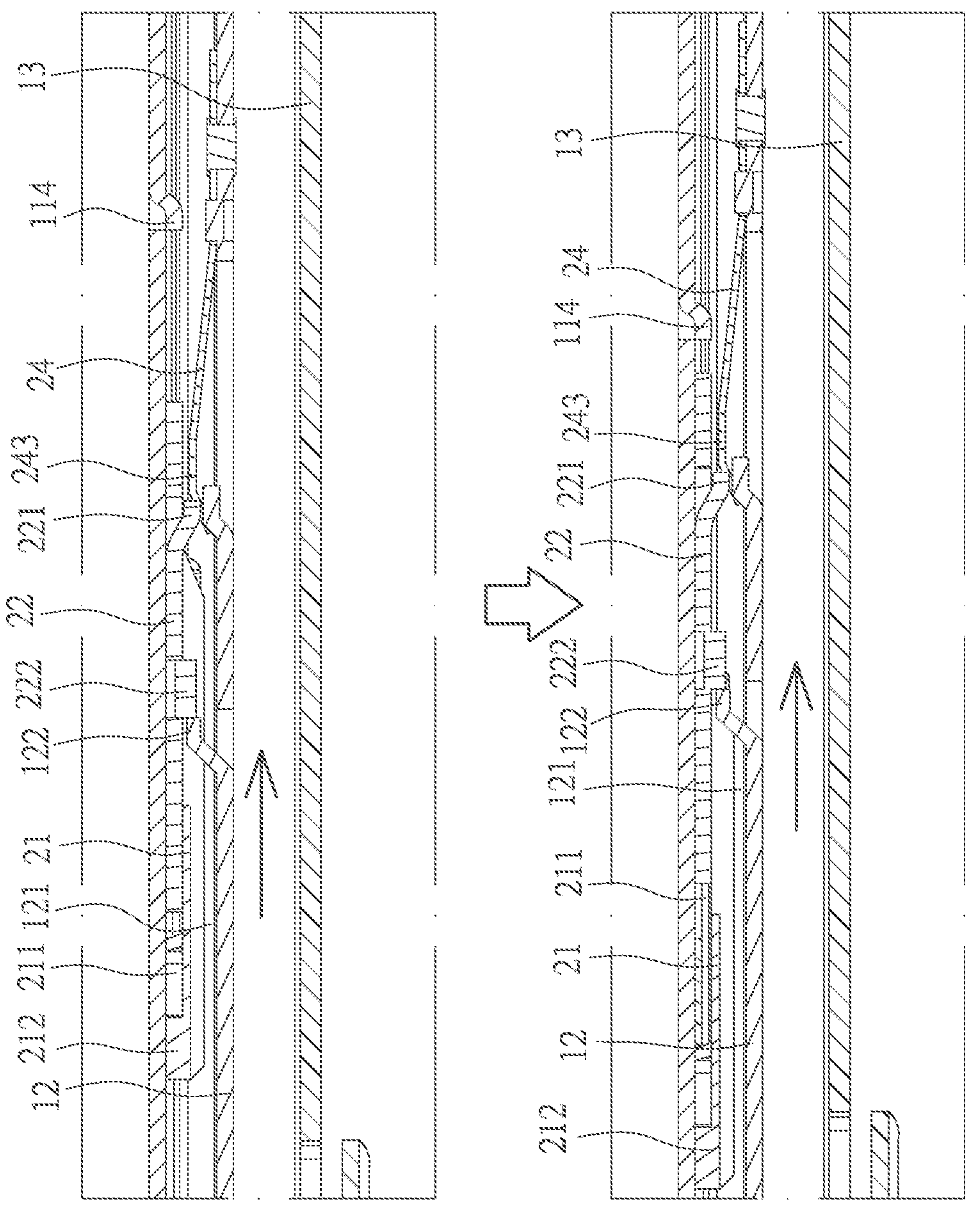
FIG. 14 illustrates a sequence of the telescopic rail of this invention being pushed back and releasing the limiting state of the extension rail.
Figure 15:
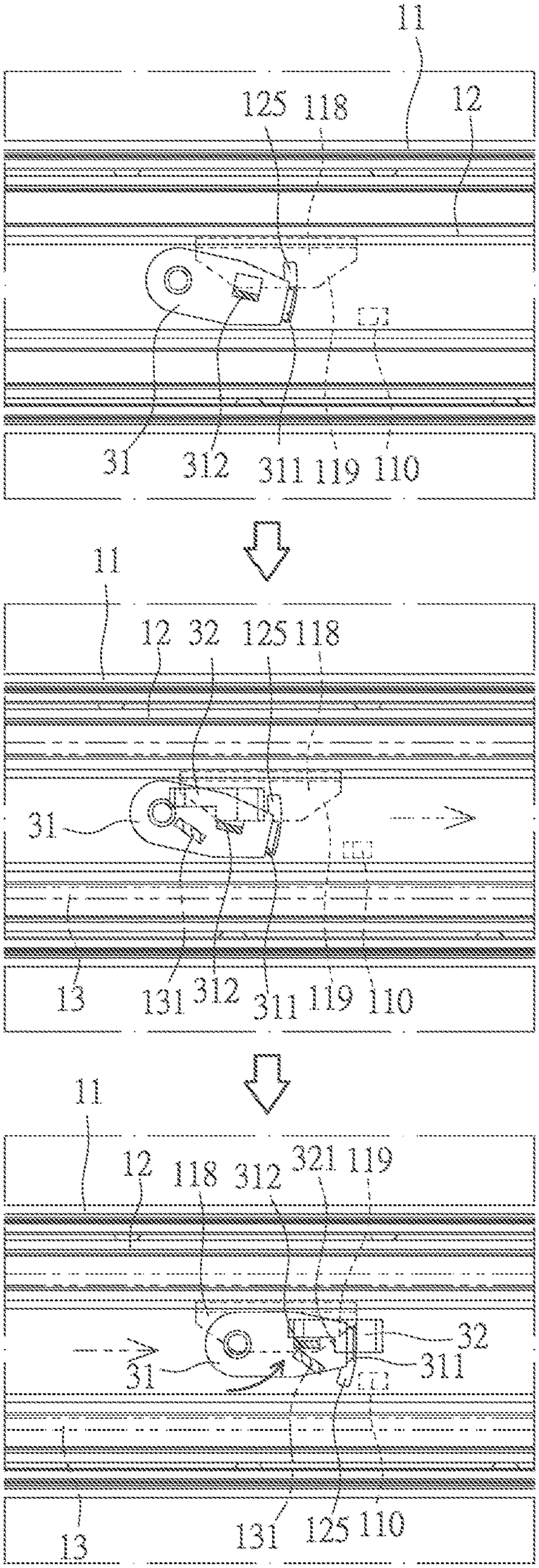
FIG. 15 illustrates a schematic diagram of the extension rail of this invention pushing back and interlocking the latch.
Figure 16:
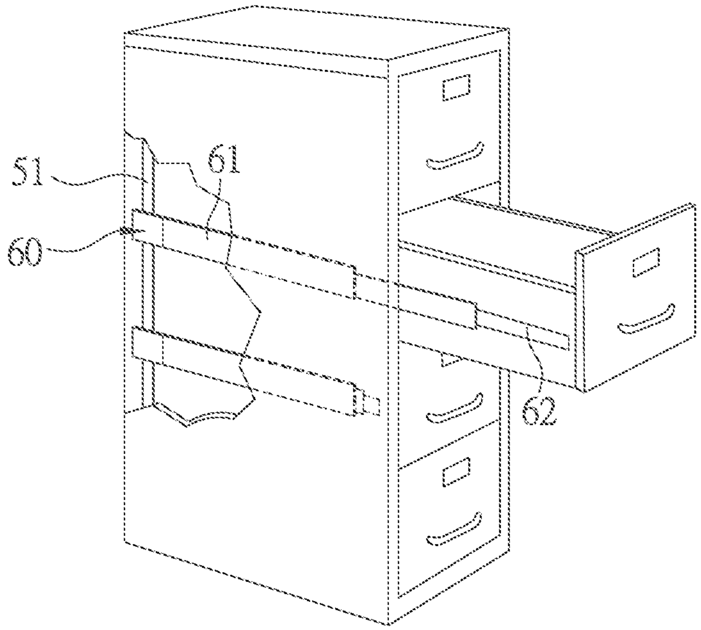
FIG. 16 PRIOR ART
FIG. 16 illustrates a schematic diagram of a conventional slide rail assembly installed in a cabinet with connecting rods.
Figure 17:
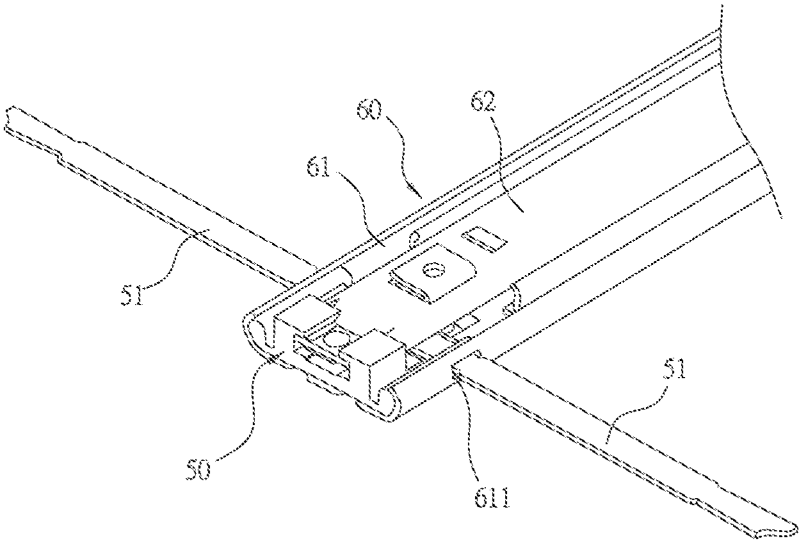
FIG. 17 PRIOR ART
FIG. 17 illustrates a schematic diagram of a conventional slide rail assembly.
Figure 18:
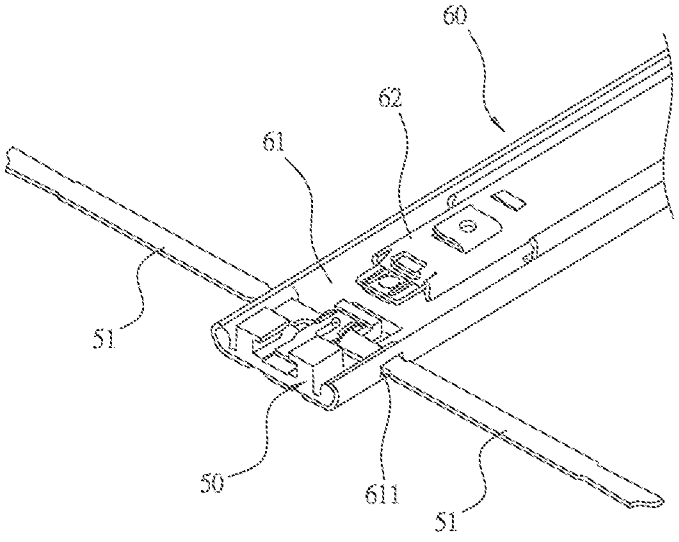
FIG. 18 PRIOR ART
FIG. 18 illustrates a schematic diagram of the telescopic rail of the conventional slide rail assembly being pulled out.

When one of the drawers in the cabinet 40 is pushed back to close, as shown in FIGS. 14 and 15, the telescopic rail 13 will first move back along the extension rail 12, the supporting protrusion 131 abuts the push portion 312 of the bucking plate 31, and then swings the bucking plate 31 upward to form a horizontal shape, so that the push portion 312 of the bucking plate 31 is higher than the limiting protrusion 110, and the extension rail 12 can be linked to retract and displace along the fixed rail 11 through the telescopic rail 13. Then the inward-pushing protrusion 122 of the extension rail 12 can be used to push against the inner push portion 222 of the latch 22 to further push the latch 22 toward the blocking protrusion 114 and keep the latch 22 away from the lock socket 216 of the lock seat 21. As shown in FIG. 7, the locking plate 23 can sink back into the guide groove 211 of the locking seat 21, so that the locking plate 23 of each locking unit 20 can move freely to reach the unlocked state of the locking unit 20, so that the drawer can be pulled out and opened.

With the structure of the above-mentioned specific embodiment, the following benefits can be obtained. This invention uses the locking unit 20 to limit the opening of only one drawer at the same time, so as to prevent the center of gravity from shifting outward due to the opening of several drawers at the same time. The risk of the cabinet 40 tipping over is avoided, thereby improving the safety of using the cabinet 40. In addition, the locking seat 21 of the locking unit 20 has a simplified structure and a greatly reduced volume, allowing the groove 121 of the extension rail 12 to slide through, so that the locking seat 21 can be installed on the non-end position of the fixed rail 11, in particular, the locking seat 21 can be directly installed at the position adjacent to the front end of the fixed rail 11, so that the assembly personnel can assemble the fixed rail 11 and install the fixed rail 11 in a relatively easy and labor-saving manner in the narrow space of the cabinet 40. The locking piece 23 greatly improves the convenience of installation of the slide rail body 10, thereby improving the assembly efficiency.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A slide rail structure, comprising:

a slide rail body, comprising a fixed rail, an extension rail sliding along the fixed rail, and a telescopic rail sliding along the extension rail; an end of the fixed rail is provided with a blocking part, and a combination part is provided in a non-end position of the fixed rail; both sides of the fixed rail are provided with two insertion holes corresponding to the combination part; a groove is recessively formed on a bottom surface of the extension rail along a forming direction; the groove is provided with an inward-pushing protrusion relative to the combination part of the fixed rail, and a through hole is provided adjacent to the inward-pushing protrusion; and a locking unit, comprising a locking seat, a latch, at least one locking plate, and a locking spring; the locking seat is installed on the combination part of the fixed rail, and a thickness of the locking seat is smaller than a depth of the groove, so as to allow the extension rail to slide and displace along the fixed rail; the locking seat has a guide groove for slidingly installing the latch; the locking seat forms a stop toward the front end of the fixed rail and forms an opening toward the other end of the fixed rail; the opening has a guide slope, and an upper surface of the locking seat is provided with a hollow portion from the opening to a middle position, and two lock sockets are provided on both sides of the locking seat corresponding to the two insertion holes connecting with the guide groove; an outer push portion and an inner push portion are protruding from a surface of the latch, and both the inner push portion and the outer push portion are introduced into the hollow portion and are lower than the upper surface of the locking seat; the locking plate is inserted between the two insertion holes of the slide rail body; both ends of the locking plate are formed a guide inclined end, the guide inclined end is inserted into the lock socket of the locking seat and connected with the latch to form the locked/unlocked states of the slide rail body; the locking spring is installed in the groove of the extension rail, the locking spring has a raised slope facing the through hole, and the end of the raised slope is bent downward to form a leading end, and a center of the leading end is concave to form an extrapolated top.

2. The slide rail structure of claim 1, wherein two ball slides are equipped between inner walls of both sides of the fixed rail and outer walls of both sides of the extension rail, the fixed rail is provided with two blocking protrusions on both sides of the front end, and two abutting protrusions are provided on both sides of the end of the extension rail, the blocking protrusions and the abutting protrusions abut against the two ends of the ball slide to further limit the length of the extension rail sliding and pulling out along the fixed rail.

3. The slide rail structure of claim 1, wherein a blocking protrusion is equipped on the fixed rail adjacent to the combination part to limit a displacement distance of the latch.

4. The slide rail structure of claim 1, wherein a buckle unit is further provided between the extension rail and the telescopic rail of the slide rail body, the buckle unit comprises a buckle plate and a positioning plate; the combination part is provided near the front end of the fixed rail and is used to install the locking seat, a first guide piece is protruding from the fixed rail near the rear end, and a second guide piece is protruding from the fixed rail between the front and rear ends adjacent to the combination part; the first guide piece is narrow at the top and wide at the bottom and has two rising slopes on both sides, the second guide piece is wide at the top and narrow at the bottom and has two sinking slopes on both sides; wherein a limiting protrusion underneath the sinking slopes is formed toward the rear end, the first and second guide pieces both face the groove of the extension rail; the bucking plate is swingably provided on the first guide piece of the extension rail adjacent to the rear end and corresponding to the fixed rail; the bucking plate comprises a detent rib at one end and an arc groove extending through the extension rail is formed for the detent rib to pass through, so that further limiting the swing range of the bucking plate and causing the detent rib to form a convex shape in the groove; a push portion is further formed on the surface of the bucking plate, the positioning plate is equipped at the telescopic rail adjacent to the rear end and corresponding to the bucking plate of the extension rail; the positioning plate comprises an outward pushing step portion, and the telescopic rail is further provided a supporting protrusion below the outward pushing step portion.

5. The slide rail structure of claim 1, wherein both ends of the locking plate are formed a guide inclined end.

* * * * *